United States Patent
Gladigau et al.

(10) Patent No.: US 9,584,880 B2
(45) Date of Patent: Feb. 28, 2017

(54) METHOD FOR THE EFFICIENT TRANSMISSION OF DATA

(71) Applicant: Robert Bosch GmbH, Stuttgart (DE)

(72) Inventors: Jens Gladigau, Stuttgart (DE); Simon Kramer, Heilbronn (DE); Heinz Tilsner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/596,323

(22) Filed: Jan. 14, 2015

(65) Prior Publication Data

US 2015/0208142 A1 Jul. 23, 2015

(30) Foreign Application Priority Data

Jan. 21, 2014 (DE) .................... 10 2014 201 029

(51) Int. Cl.
*H04Q 9/00* (2006.01)

(52) U.S. Cl.
CPC ......... *H04Q 9/00* (2013.01); *H04Q 2209/823* (2013.01)

(58) Field of Classification Search
CPC .......................... H04Q 9/00; H04Q 2209/823
USPC ...................................... 340/870.07–870.09
See application file for complete search history.

(56) References Cited

U.S. PATENT DOCUMENTS

| | | | |
|---|---|---|---|
| 2006/0238324 A1* | 10/2006 | Kachouh | B60C 23/0464 340/442 |
| 2012/0191415 A1* | 7/2012 | Naito | H04Q 9/00 702/188 |
| 2015/0006141 A1* | 1/2015 | Enenkel | G06F 17/5036 703/18 |

* cited by examiner

*Primary Examiner* — Qutbuddin Ghulamali
(74) *Attorney, Agent, or Firm* — Gerard Messina

(57) ABSTRACT

In a method for transmitting data from a sensor to a processor via at least one communication medium in a communication network, a sensor value of the sensor is transmitted to the processor, and the processor uses the transmitted sensor value for processing until a new sensor value is transmitted to the processor, which new sensor value is transmitted only if at least one condition for the new sensor value is satisfied.

23 Claims, 1 Drawing Sheet

METHOD FOR THE EFFICIENT TRANSMISSION OF DATA

BACKGROUND OF THE INVENTION

1. Field of the Invention

The present invention relates to a method for the efficient transmission of data, in particular of sensor values.

2. Description of the Related Art

The so-called memory-mapped I/O method may be used, for example, as a method for transmitting data between peripheral devices and processors in digital systems. For this purpose, I/O registers of the peripheral devices are mapped onto the memory address space of a processor; access to these registers then being gained via a memory access routine. If the peripheral device is a sensor, processors may access the value currently detected by the sensor via defined memory addresses.

In typical embedded systems, for example in the engine control system in a vehicle, sensor values are regularly processed by a processor. The processing of sensor values may be roughly divided into three steps: a property is detected by a sensor and is digitized; the processor that processes the sensor value reads the current sensor value; and the processor processes the sensor value.

In a system that has many processors (multi-core or many-core system), the processors usually have a local memory, which may also be writable via a global address. The sensor value may then be copied first to the local memory of the processor; and the processing of the sensor value may then be performed using the local copy. Reading out a sensor value may occupy a shared resource in the process, for example a communications bus or a network-on-chip (NoC).

Such systems have the disadvantage, however, that the resource is occupied at least nearly continuously and that the data transmission consumes much current.

It is therefore desirable to indicate a method that allows for an efficient transmission of data and low current consumption.

BRIEF SUMMARY OF THE INVENTION

In a method according to the present invention for transmitting data from a sensor to a processor via at least one communication medium, a sensor value of the sensor is transmitted to the processor. For this purpose, the processor uses the transmitted sensor value for processing until a new sensor value is transmitted to the processor, a new sensor value being transmitted only when at least one condition is satisfied for the sensor value. For this purpose, one or multiple conditions may be selected from multiple possible conditions for example. It is also conceivable that only one condition exists that must be satisfied. This type of data transmission may also be carried out for multiple sensors and processors, which are connected via the at least one communication medium. This relieves the communication medium since sensor values are not constantly transmitted from sensors to processors, but only when it is necessary. It is also not necessary for the processors to read the sensor values out themselves, but rather the sensor values are transmitted to the processors when needed. In addition to keeping the communication medium free for other purposes besides the transmission of sensor values, the consumption of current and energy is also reduced thereby.

The at least one condition preferably includes the condition that the sensor value has changed at least by a predetermined threshold value. This has the advantage that the sensor value is not transmitted at all if it has not changed or has changed only little with respect to a previous value. For the current sensor value in that case is already present in the processor.

The at least one condition advantageously includes the condition that a change of the sensor value is relevant for processing. This has the advantage that the sensor value does not have to be transmitted at all if it is currently not needed and/or if the value currently present in the processor is sufficient for processing.

It is advantageous if the at least one condition includes the condition that the sensor value after a change deviates from a precalculated value. If it is possible to calculate a sensor value in advance, at least approximately, and a new sensor value lies within such a precalculation, then it is not necessary to transmit the new sensor value since the current sensor value is thus already known in the processor, i.e. is able to be precalculated.

It is furthermore advantageous if the at least one condition includes a minimum time duration and/or a maximum time duration since the transmission of the last sensor value. It is thereby possible to avoid overloading processors and the communication medium. Additionally, this also ensures that the sensor values are current.

Preferably, a prediction of the sensor value is transmitted together with the sensor value, in particular in the form of a mathematical function and/or a list of values. This makes it possible for the processor to calculate a sensor value in advance, at least within certain limits, which avoids unnecessary transmissions of new sensor values.

Advantageously, at least one memory address for a, particularly local, memory is taken into account in transmitting the sensor value. It is thus possible to write the sensor value directly to this memory address. This ensures quick processing of the sensor value in the processor since the sensor value is supplied to the processor in an optimized fashion.

It is advantageous if for each pair of processor and sensor value, the at least one condition is individually specified statically and/or dynamically. This makes it possible to distinguish between different types of sensors or their sensor values, for example with respect to security aspects, in the transmission of these sensor values.

The sensor value is preferably transmitted by the sensor to the processor if the sensor is set up for this purpose. This makes it possible to omit additional processing units.

Alternatively, the sensor value is transmitted to the processor from an additional processor, the additional process being provided in particular only for transmitting sensor values. In this instance, the additional processor may also be connected via a communication medium to the sensors and via another communication medium to the processors. This makes it furthermore possible to use conventional sensors, it only being necessary to use an additional processor, which is preferably placed in spatial proximity to the sensors, in order to reduce transmission times.

The method according to the present invention is used preferably in motor vehicles, in particular in control units that have corresponding processors, and sensors of motor vehicles. Additional possible areas of use are electronic systems, which process sensor data, in particular regularly, for example systems for industrial automation, power tools, monitoring devices, medical devices, systems in the area of home automation, mobile terminal devices or drones.

A processing unit according to the present invention, e.g. a control unit or a sensor of a motor vehicle, is set up, particularly in terms of software, to carry out a method according to the present invention.

The implementation of the method in the form of software is also advantageous, since this incurs particularly low costs, especially if an executing control unit is also used for other tasks and is therefore present anyway. Suitable data carriers for providing the computer program are, in particular, diskettes, hard disks, flash memories, EEPROMs, CD-ROMs, DVDs etc. A download of a program via computer networks (Internet, intranet, etc.) is also possible.

Further advantages and developments of the present invention derive from the description and the enclosed drawing.

It is understood that the features mentioned above and the features yet to be described below may be used not only in the combination indicated in each case but also in other combinations or individually, without departing from the scope of the present invention.

The present invention is represented schematically in the drawing on the basis of exemplary embodiments and described in detail below with reference to the drawing.

DETAILED DESCRIPTION OF THE INVENTION

Figure 1:
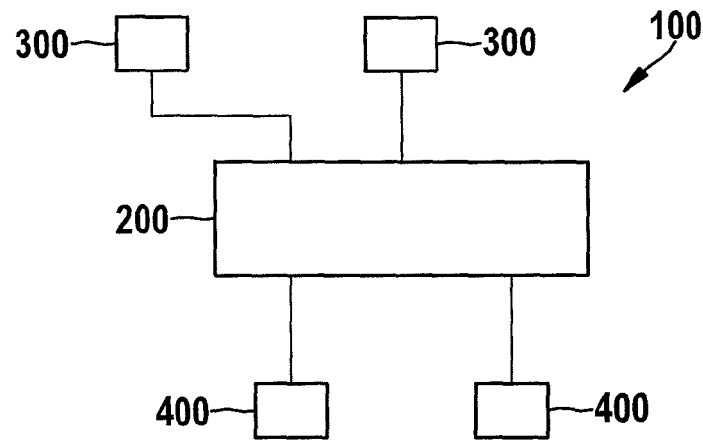
FIG. 1 schematically shows a communication network for a method according to the present invention in a preferred embodiment.

FIG. 1 schematically shows a communication network 100 for a method according to the present invention in a preferred embodiment. Communication network 100 includes a communication medium 200, to which two processors 300 and two sensors 400 are connected by way of example. The number of processors and sensors may vary as needed.

Communication medium 200 is a shared data transmission resource such as, for example, a network-on-chip (NoC) or a bus such as, for example, CAN, LIN or Flexray. A combination of both is conceivable as well. This common data transmission resource is used by all or at least multiple processors, particularly also for purposes other than the transmission of sensor values. These may be processors in an engine control unit, for example, which is connected to a crankshaft sensor, a rail-pressure sensor, a cylinder-pressure sensor etc.

A sensor 400 regularly detects a sensor value, i.e. at predetermined intervals for example, and transmits initially a sensor value via communication medium 200 to a processor 300. Depending on the embodiment and the requirement, the sensor value may also be transmitted to multiple processors 300. Sensor 400 itself is thus designed to transmit sensor values.

A transmission occurs for example by write access to a local memory of processor 300 or by an interrupt routine on processor 300.

Now, a new transmission of a sensor value by sensor 400 does not occur immediately or according to a predetermined regular schema, but rather only if one or more conditions are satisfied.

One possibility for a condition is that the sensor value has changed, for example at least by a predetermined threshold value. This avoids the transmission of a sensor value that does not differ, or differs only negligibly, in particular also within a certain (measuring) accuracy, from the previous sensor value. Processor 300 continues to use the most recently transmitted sensor value for processing.

Another possibility for a condition is that the sensor value is relevant for processing since, for example only safety-related sensor values, for example when they exceed a critical threshold value, are relevant for processing. An unnecessary transmission of sensor values may thus be omitted.

Yet another possibility for a condition is that the sensor value, following a change, deviates from a precalculated value. For this purpose, a prediction, for example in the form of a mathematical function and/or a list of values, may be transmitted along with the sensor value if the latter is transmitted. This allows processor 300 itself to calculate a change of the sensor value in advance, at least within certain limits. Only if the actual value deviates from the value calculated in advance on the basis of the prediction, which is also precalculated in sensor 400, will the sensor value be transmitted anew to processor 300.

In addition, it is possible to take into account for the conditions also minimum and/or maximum time durations since the last transmission of a sensor value. For example, a maximum time duration may be specified, within which at the latest a sensor value must again be transmitted. This may be the case for safety-related reasons for example.

A minimum time duration is practical for example in order to avoid overloading processor 300 or communication medium 200.

When transmitting a sensor value from a sensor 400 to a processor 300, additionally a memory address for a local memory of processor 300 is taken into account in order to write the sensor value to this memory address and thus to ensure fast processing. An identification of processor 300 is also conceivable, which indicates whether sensor values are able to be received.

When transmitting sensor values, it is possible, depending on need and embodiment, to take into account only one of the above-mentioned conditions or a combination of multiple conditions. Additional conditions not mentioned here are possible as well.

The conditions are transmitted expediently by processor 300, which knows the requirements of its functions, to sensor 400. This may occur for example during an initialization or startup of the system and/or dynamically during operation. Likewise, it is possible to transmit an allowed and/or desired method for the prediction during the initialization and/or dynamically in operation from processor 300 to sensor 400.

The transmission within the scope of one or multiple conditions, as explained above for a sensor 400 and a processor 300, may be individually defined in communication network 100 for each pair of processor 300 and sensor value or sensor 400 (one sensor may also provide multiple different sensor values. Such a definition for each pair may occur both statically, i.e. be already specified in a fixed manner, or also dynamically, i.e. it may be adapted depending on situation and/or need.

A sensor 400 according to the present invention may additionally be developed in such a way that, apart from the independent transmission of sensor values, it may also be read out for example via memory mapped I/O. Thus a compatibility is ensured with communication networks that function in accordance with the related art, as mentioned at the outset.

Figure 2:
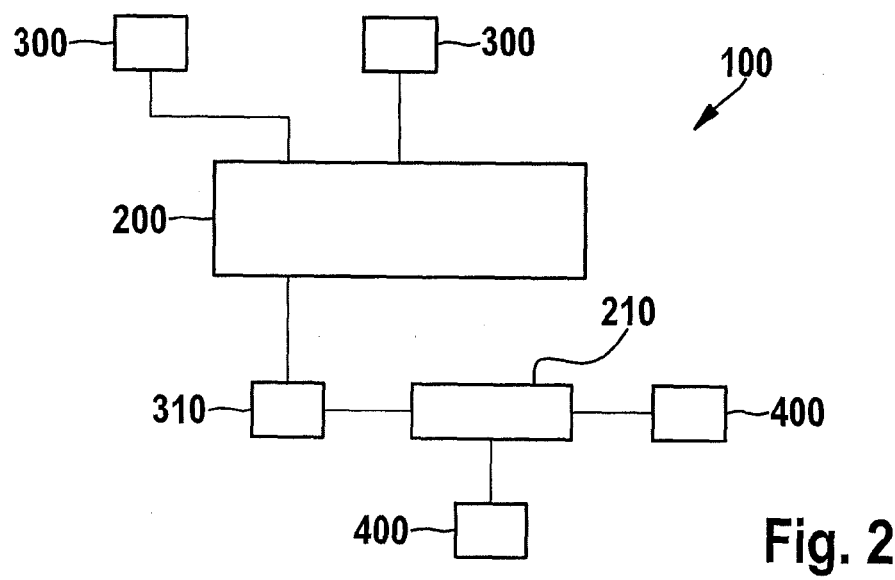
FIG. 2 schematically shows a communication network for a method according to the present invention in another preferred embodiment.

FIG. 2 schematically shows a communication network 100 for a method according to the present invention in another preferred embodiment. Communication network 100 includes a communication medium 200, to which two processors 300 are connected in exemplary fashion, as well as a communication medium 210, to which two sensors 400 are connected in exemplary fashion. The number of processors and sensors may vary as needed.

Communication medium 200 is a shared data transmission resource such as, for example, a network-on-chip (NoC) or a bus such as, for example, CAN, LIN or Flexray. A combination of both is conceivable as well. This common data transmission resource is used by all or at least by multiple processors. Communication medium 210 is a bus, in particular a peripheral bus, for example CAN, LIN or Flexray, for connecting sensors 400.

The processors are in particular processors of an engine control unit or of another control unit of a motor vehicle. Corresponding sensors are preferably crankshaft sensors, rail-pressure sensors or cylinder-pressure sensors etc.

In contrast to the communication network described in FIG. 1, communication network 100 furthermore includes another processor 310, which is connected both to communication medium 200 as well as to communication medium 210. Via communication medium 210, the additional processor 310 is thus connected to sensors 400.

The manner of functioning of the method corresponds to the method described with respect to FIG. 1, with the difference, however, that a sensor value is not transmitted by sensor 400 itself to processor 300, but rather the sensor value is read out by the additional processor 310, for example using memory mapped I/O as described at the outset in the related art, and is then transmitted by the latter to a processor 300.

This has the advantage that sensors 400 do not have to be set up to transmit sensor values independently. It is thus possible to use sensors according to the related art. The additional processor 310 is provided in particular only for reading out and transmitting sensor values. It is situated, as much as possible, in spatial proximity to sensors 400, in order to keep transmission times short. Additional processor 310 may read out sensors 400 regularly, but the subsequent transmission to processors 300 occurs only in accordance with the method of the present invention.

The load on communication medium 200 is in this case just as low as in the method described with reference to FIG. 1 since again sensor values are transmitted to processors 300 only when needed.

Depending on the number of sensors 400 and processors 300 and/or the required transmission volume, it is also possible to use multiple additional processors 310. As an additional processor 310, a specially adapted and limited controller may be provided for example, which processes the described method. Likewise, a method programmed purely via software on a standard processor is conceivable, in which case only standard components are required for carrying out the method according to the present invention.

What is claimed is:

1. A method for transmitting data from a sensor to a processor via at least one communication medium in a communication network, the method comprising:
   transmitting a sensor output value of the sensor to the processor;
   using, by the processor, the transmitted sensor output value for processing until a new sensor output value is transmitted to the processor; and
   transmitting the new sensor output value to the processor only if at least one condition for the new sensor output value is satisfied, the at least one condition including that the new sensor output value has changed by at least a predetermined threshold value in comparison to the previously transmitted sensor output value.

2. The method as recited in claim 1, wherein the at least one condition includes that a change of the new sensor output value in comparison to the previously transmitted sensor output value is relevant for processing.

3. The method as recited in claim 1, wherein the at least one condition includes that the new sensor output value deviates from a precalculated value.

4. The method as recited in claim 1, wherein the at least one condition includes at least one of: a minimum time duration has elapsed since the previous transmission of the sensor output value, or a maximum time duration has elapsed since the previous transmission of the sensor output value.

5. The method as recited in claim 1, wherein a memory address of the processor is taken into account in the transmission of the sensor output value.

6. The method as recited in claim 1, wherein the sensor output value is transmitted by the sensor to the processor.

7. A method for transmitting data from a sensor to a processor via at least one communication medium in a communication network, the method comprising:
   transmitting a sensor output value of the sensor to the processor;
   using, by the processor, the transmitted sensor output value for processing until a new sensor output value is transmitted to the processor; and
   transmitting the new sensor output value to the processor only if at least one condition for the new sensor output value is satisfied,
   wherein each transmitted sensor output value is accompanied by a prediction of a next sensor output value.

8. The method as recited in claim 7, wherein the prediction of the next sensor output value includes at least one of: a mathematical function, or a list of potential values.

9. A method for transmitting data from a sensor to a processor via at least one communication medium in a communication network, the method comprising:
   transmitting a sensor output value of the sensor to the processor;
   using, by the processor, the transmitted sensor output value for processing until a new sensor output value is transmitted to the processor; and
   transmitting the new sensor output value to the processor only if at least one condition for the new sensor output value is satisfied, wherein the at least one condition is individually specified for each pair of the processor and the sensor output value.

10. The method as recited in claim 9, wherein the at least one condition is individually specified statically for each pair of the processor and the sensor output value.

11. The method as recited in claim 9, wherein the at least one condition is individually specified dynamically for each pair of the processor and the sensor output value.

12. A method for transmitting data from a sensor to a processor via at least one communication medium in a communication network, the method comprising:
   transmitting a sensor output value of the sensor to the processor;
   using, by the processor, the transmitted sensor output value for processing until a new sensor output value is transmitted to the processor; and transmitting the new sensor output value to the processor only if at least one condition for the new sensor output value is satisfied,
wherein the sensor output value is transmitted by another processor to the processor.

13. The method as recited in claim 12, wherein the another processor is provided only for transmitting sensor values.

14. The method as recited in claim 12, wherein the another processor is connected via a first communication medium to the sensor and connected via a second communication medium to the processor.

15. A non-transitory, machine-readable storage medium having program instructions, which when executed by a processor perform a method for transmitting data from a sensor to a processor via at least one communication medium in a communication network, the method comprising:
transmitting a sensor output value of the sensor to the processor;
using, by the processor, the transmitted sensor output value for processing until a new sensor output value is transmitted to the processor; and
transmitting the new sensor output value to the processor only if at least one condition for the new sensor output value is satisfied, the at least one condition including that the new sensor output value has changed by at least a predetermined threshold value in comparison to the previously transmitted sensor output value.

16. The non-transitory, machine-readable storage medium as recited in claim 15, wherein the at least one condition includes that the new sensor output value deviates from a precalculated value.

17. The non-transitory, machine-readable storage medium as recited in claim 15, wherein each transmitted sensor output value is accompanied by a prediction of a next sensor output value.

18. The non-transitory, machine-readable storage medium as recited in claim 15, wherein the at least one condition is individually specified for each pair of the processor and the sensor output value.

19. The non-transitory, machine-readable storage medium as recited in claim 15, wherein the sensor output value is transmitted by another processor to the processor.

20. A method for transmitting data from a sensor to a processor via at least one communication medium in a communication network, the method comprising:
transmitting a sensor output value of the sensor to the processor; and
transmitting a new sensor output value to the processor upon a determination that at least one condition for the new sensor output value is satisfied, the at least one condition including that the new sensor output value has changed by at least a predetermined threshold value in comparison to the previously transmitted sensor output value.

21. The method as recited in claim 20, wherein the at least one condition includes that the new sensor output value deviates from a precalculated value.

22. The method as recited in claim 20, wherein each transmitted sensor output value is accompanied by a prediction of a next sensor output value.

23. The method as recited in claim 20, further comprising using, by the processor, the transmitted sensor output value for processing until the new sensor output value is transmitted to the processor.

* * * * *